INVENTOR
Edgar I. McGee
by his attorneys
Byrnes, Stebbins, Parmelee & Blenko

Patented Mar. 6, 1934

1,949,429

UNITED STATES PATENT OFFICE 1,949,429

FLUID SEAL

Edgar I. McGee, Scottdale, Pa., assignor to Fluid Seal Corporation, a corporation of Delaware Application May 3, 1930, Serial No. 449,590

2 Claims. (Cl. 103—111)

My invention relates to a method and means for sealing a joint between two elements, one of which is rotatable with respect to the other. The invention finds its most important application in sealing the impellers of centrifugal pumps and fans to the casings thereof, although there are numerous other applications.

The present design of centrifugal pumps is characterized by numerous undesirable features. In the first place, the impeller of the pump requires a shaft separate and independent from that of the driving medium. A coupling means is also required for connecting the impeller shaft to the driving shaft. One of the outstanding disadvantages, however, is that the pump must be provided with stuffing boxes, packing glands, or other accessories for sealing the impeller in the casing. Because of the close fit required in the bearings and stuffing boxes, a cooling system is necessary to prevent overheating thereof. Close-running wearing rings, furthermore, are required in the casing and on the impeller and the machining of the parts for receiving these rings adds considerably to the cost of a pump. Alinement of the drive shaft and the pump shaft, of course, must be very accurate.

Centrifugal fans as now constructed are comparatively inefficient since there is a wide clearance between the wheel and the casing made necessary by inaccuracies in the construction of the parts. This feature is especially noticeable in fans of the larger sizes. Because of the wide clearance between the wheel and the casing, a considerable proportion of the air driven through the casing by the wheel does not pass through the outlet conduit, but, on the contrary, escapes through the space between the wheel and casing to the low-pressure or inlet opening of the fan and is then circulated through the wheel again. This circulation is not effective in supplying air to the outlet conduit and, therefore, represents an energy loss which is reflected in lowered efficiency.

I have invented a method and means for sealing surfaces, one of which rotates with respect to the other and, especially, for sealing the impellers and wheels of pumps and fans to their casings to simplify the construction thereof and improve their efficiency. The use of the invention in a centrifugal pump makes it unnecessary to provide an additional shaft for the pump since the impeller is mounted directly on the shaft of the motor or other driving medium. The bearings and lubrication system for the pump shaft are also eliminated. No stuffing boxes or packing glands are necessary and, since there is a considerable clearance between the impeller and casing, no wearing rings need be provided. By avoiding the use of wearing rings, the amount of machine work is reduced and the cost correspondingly lowered. Further economies in construction result in the use of a shorter base for the pump and motor which affords a rigid mounting for all the members. This construction saves space and weight and facilitates handling. Because of the considerable clearance between rotating parts, accurate alinement of the motor and the pump casing is not necessary. The pump can be built with either horizontally or vertically split casing. Since close fitting bearings and stuffing boxes are not required, the cooling system therefor can be omitted.

If the pump is to be belt driven, the invention also makes possible economies in construction. In such case, the bearings can be of the plain pedestal type with the shaft mounted therein carrying the impeller. Accurate alinement of bearings and pump casing is not vital. In the case of large size motor-driven pumps, it may be necessary to provide a separate shaft for the impeller, but an economical construction may be arrived at by using a rigid coupling between the motor and pump shafts and a single outboard bearing for the latter. Another alternative is the use of two bearings for the pump and a flexible coupling for connecting it to the motor shaft. In either case, the use of stuffing boxes or sealing rings is avoided.

Similar advantages characterize the use of the invention in connection with centrifugal fans. Circulating currents are prevented and the amount of air delivered by the fan is thus increased. Almost any desired clearance between the fan and the casing may be utilized without impairing the efficiency of the apparatus. The construction need not, therefore, be as accurate as that required where no seal is provided.

According to the invention, I seal the joint between a rotary member and a stationary member by providing an annular channel on one member which is adapted to receive a sealing fluid. On the other member, I provide an annular fin or ring projecting into the channel. The rotating member carries means for driving the sealing medium through the annular channel. It is also within the scope of the invention to provide the rotating member with an annular channel and the stationary member with an annular fin or ring projecting into said channel. In this case, the rotation of the channel imparts the required movement to the sealing medium.

The rotation of the sealing medium causes it to fill the space between the annular ring and the walls of the channel throughout the circumference thereof. Because of the centrifugal effect of the whirling ring of sealing medium, it is possible to seal the joint against considerable differences in pressure. The rotary member may carry either the annular channel or the ring projecting thereinto.

For a complete understanding of the invention, reference is made to the accompanying drawings, in which Figure 1 is a side elevation of a centrifugal pump embodying a preferred form of the invention;

Figure 6 is a partial sectional view along the line VI—VI of Figure 5;

Figure 1:
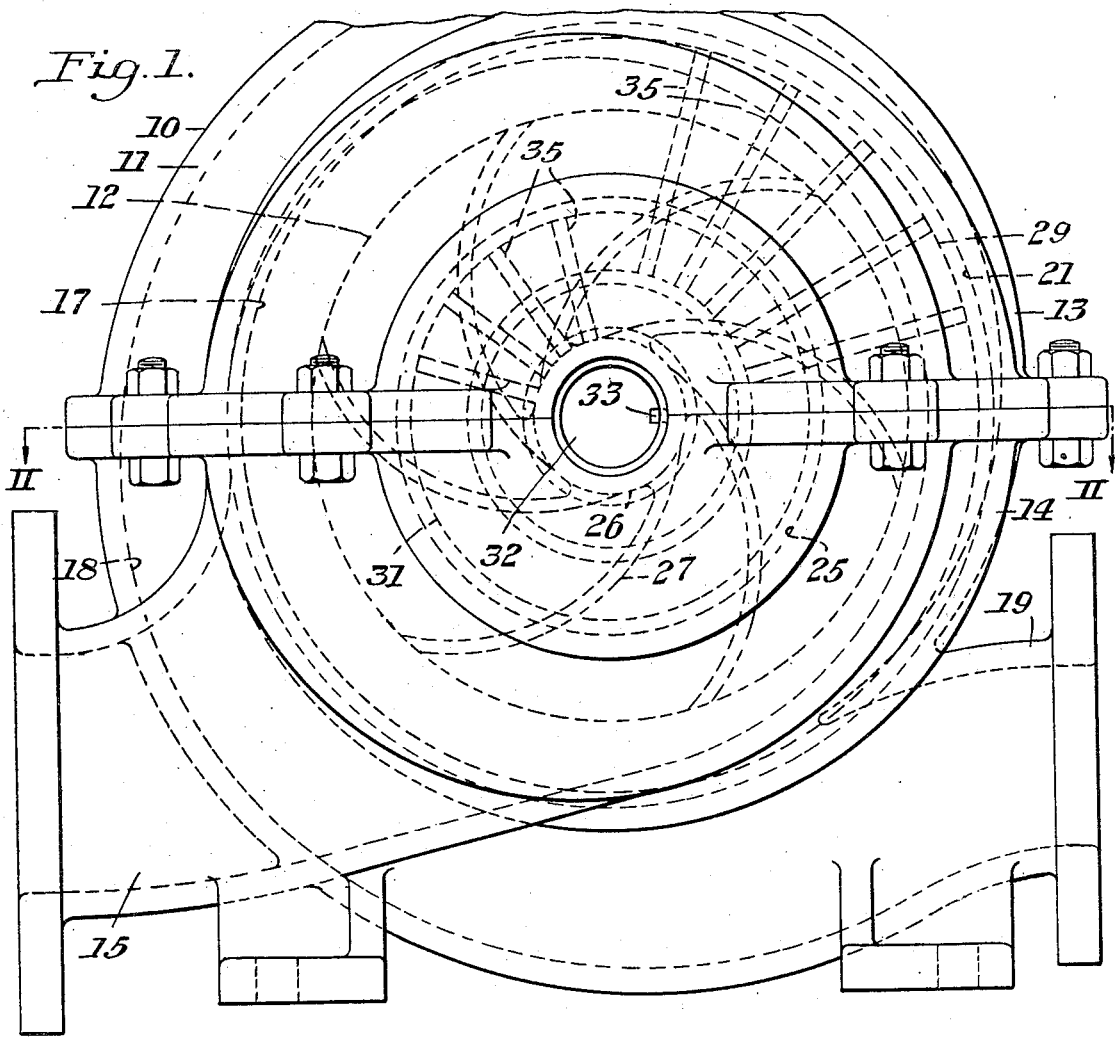

The apparatus shown in the drawings is intended to serve merely as illustrative examples and the modifications shown are in nowise to limit the scope of the invention. It may be practiced in other forms within the scope of the broader claims.

Figure 2:
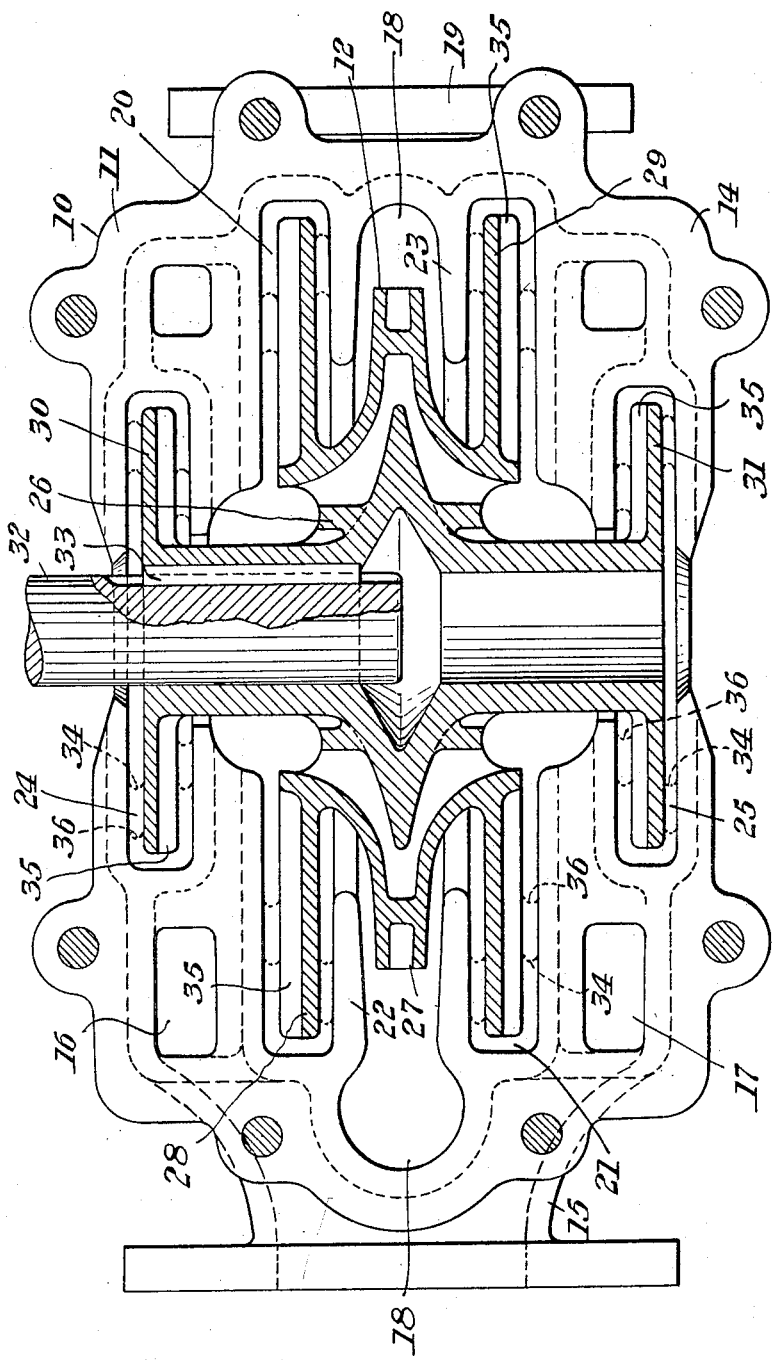
Figure 2 is a sectional view of the preferred form taken along the line II—II of Figure 1.

Referring to the drawings, and in particular, to Figs. 1 and 2, a centrifugal pump 10 comprises a casing 11 and an impeller 12. The casing is split horizontally along a plane passing through the axis of the impeller into an upper half 13 and a lower half 14. The lower half of the casing includes a flanged inlet conduit 15, terminating in annular chambers 16 and 17 which extend around the impeller for supplying fluid thereto in a radial direction throughout its circumference. An outlet conduit 18 of increasing diameter extends around the pump casing between the annular chambers 16 and 17 for receiving the fluid discharged by the blades of the impeller 12. Conduit 18 terminates in a flanged outlet 19.

In addition to the annular chambers 16 and 17 and the discharge conduit 18, the casing 11 of the pump is provided with annular channels 20 and 21. The channels 20 and 21 are separated from the discharge conduit 18 by the inwardly projecting rings 22 and 23. Additional annular channels 24 and 25 are formed in the casing adjacent the inlet passages 16 and 17.

The impeller 12 comprises a spider 26 which carries a plurality of blades 27. Adjacent the blades, a pair of annular rings 28 and 29 are formed on the impeller. These rings project into the annular channels 20 and 21. A second set of rings 30 and 31 are carried by the spider and are adapted to fit within the channels 24 and 25.

It will be observed that the pump shown in Figures 1 and 2 is composed of but three integral castings, the upper and lower halves 13 and 14 of the casing 11 and the impeller 12. The impeller is carried on a shaft 32 being keyed thereto by means of a key 33. The shaft 32 may be that of a driving motor or other power source. It will also be apparent that there is a wide clearance at all points between the impeller 12 and the casing 11. This fact makes it unnecessary to machine any of the parts to any considerable extent and the cost of the pump is very much reduced thereby. Instead of providing sealing rings, stuffing boxes or packing glands, for sealing the impeller to the casing, I rely upon the centrifugal effect of a sealing medium placed within the channels 20 and 21, 24 and 25. When the impeller 12 is rotated, the sealing medium in the channels is driven about the circumference thereof and forms a continuous wall as indicated at 34. In order to insure the rapid rotation of the sealing medium, I provide the rings 28, 29, 30 and 31 with lateral projections 35, which serve as blades or vanes to drive the sealing medium around the channels. When the impeller is stationary, the sealing medium, indicated at 34, sinks to the bottom of the channels.

If a difference in pressure exists between the inside and the outside of the casing 11, the lower pressure being inside the casing, the sealing medium will take up the position indicated at 36. As a result of the difference in pressure, the height of the medium in the low-pressure side increases while it falls in the high-pressure side. Because of the increased weight of the medium forced to the low-pressure side by the difference in pressure, the centrifugal effect thereof increases to an extent such that the centrifugal force exerted by the whirling sealing medium balances the difference in pressure. Instead of water, I may, of course, employ other sealing fluids such as oil, mercury, or the like.

The invention is also adapted for the handling of liquids having solid matter, such as sand or coal dust, in suspension. In such instance, the liquid having the solid matter suspended in it serves equally well as a sealing medium. In fact, any fluid which the pump can handle will provide the necessary sealing.

The invention thus provides means for sealing the low-pressure inlet chamber of the centrifugal pump against the atmospheric pressure outside the pump, which, in the absence of a seal, will prevent the pump from functioning. The invention is also employed to seal the high-pressure outlet chamber of the pump against the low pressure in the inlet chamber to prevent by-passing of fluid from the high-pressure chamber to the low-pressure chamber through the space between the impeller and the casing. A perfect seal between the rotating and stationary parts of the pumps is thus secured, despite the fact that considerable clearance exists therebetween.

To start the pump, it is primed in the same manner as any centrifugal pump, except that the impeller must be turning before the priming is attempted. The first time the pump is used, it will be necessary to supply water or other sealing fluid to the channels 24 and 25. This may be done in any convenient manner, such as by a hose connected to a suitable source of water and leading into the channels, or merely by pouring water into the channels through the openings in the ends of the casing. Only a very small quantity of water need be supplied to channels 24 and 25 initially, since a supply of fluid is thereafter maintained direct from the body of fluid being handled by the pump. It is not necessary to supply fluid from an external source to the channels 20 and 21 since, as soon as the pump begins to discharge fluid, the fluid will tend to leak around the rings 22 and 23 into the low-pressure chamber of the pump. In this way, the channels 20 and 21 are filled and the rotation of the blades 35 soon causes the fluid to whirl with sufficient velocity to establish a centrifugal force balancing that of the pressure difference. After the pump has once been started and the sealing fluid supplied, it is unnecessary to renew the supply of fluid unless the pump stands idle for considerable lengths of time, in which case evaporation may require a slight addition of make-up fluid.

Figure 3:
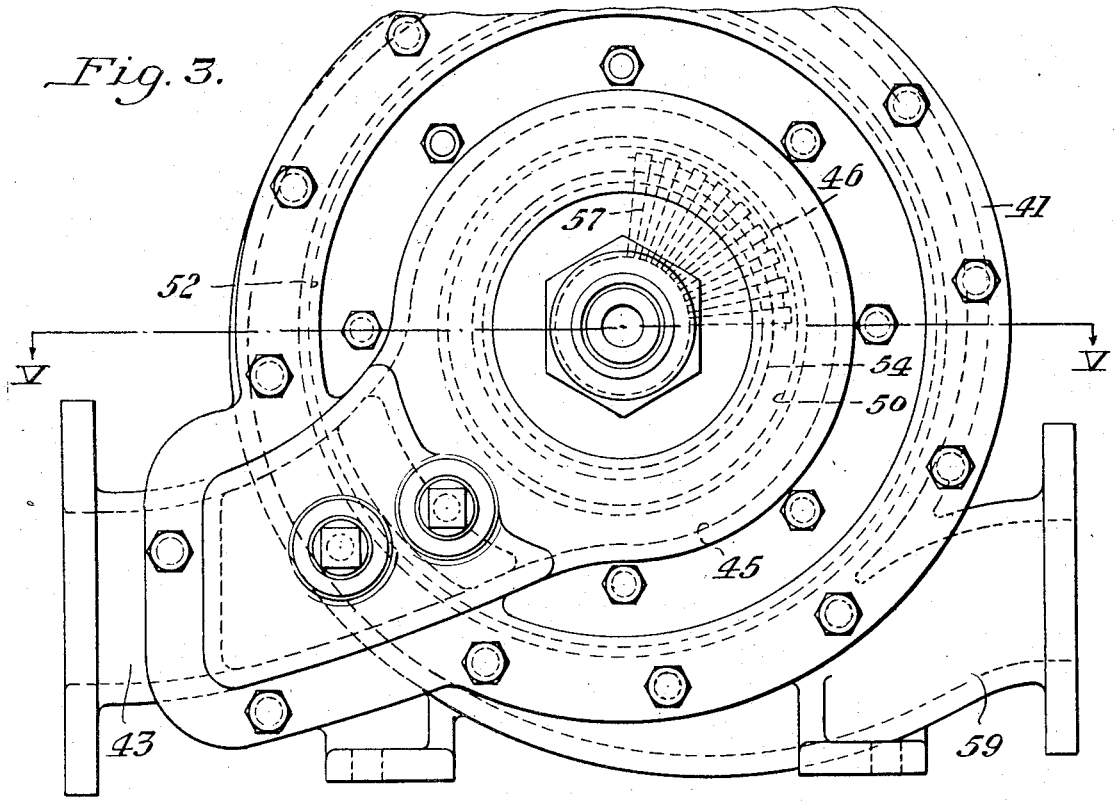
Figure 3 is a side elevation of a modified form.
Figure 4:
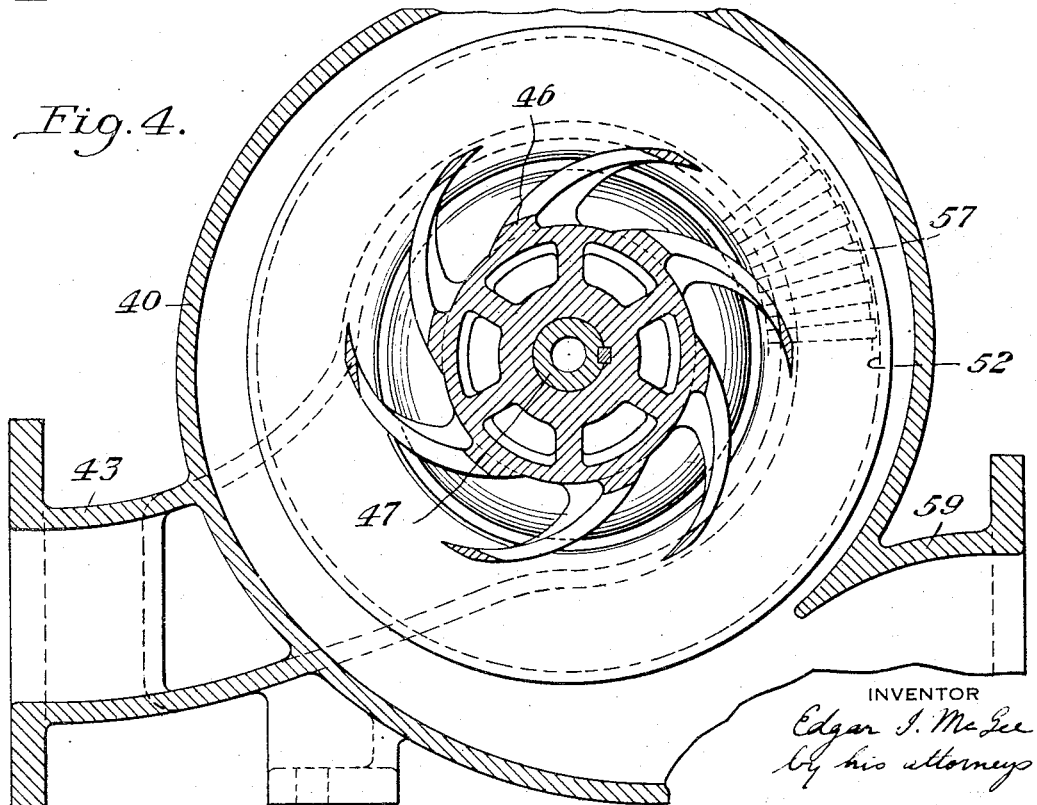
Figure 4 is a central vertical section therethrough along the line IV—IV of Figure 5.
Figure 5:
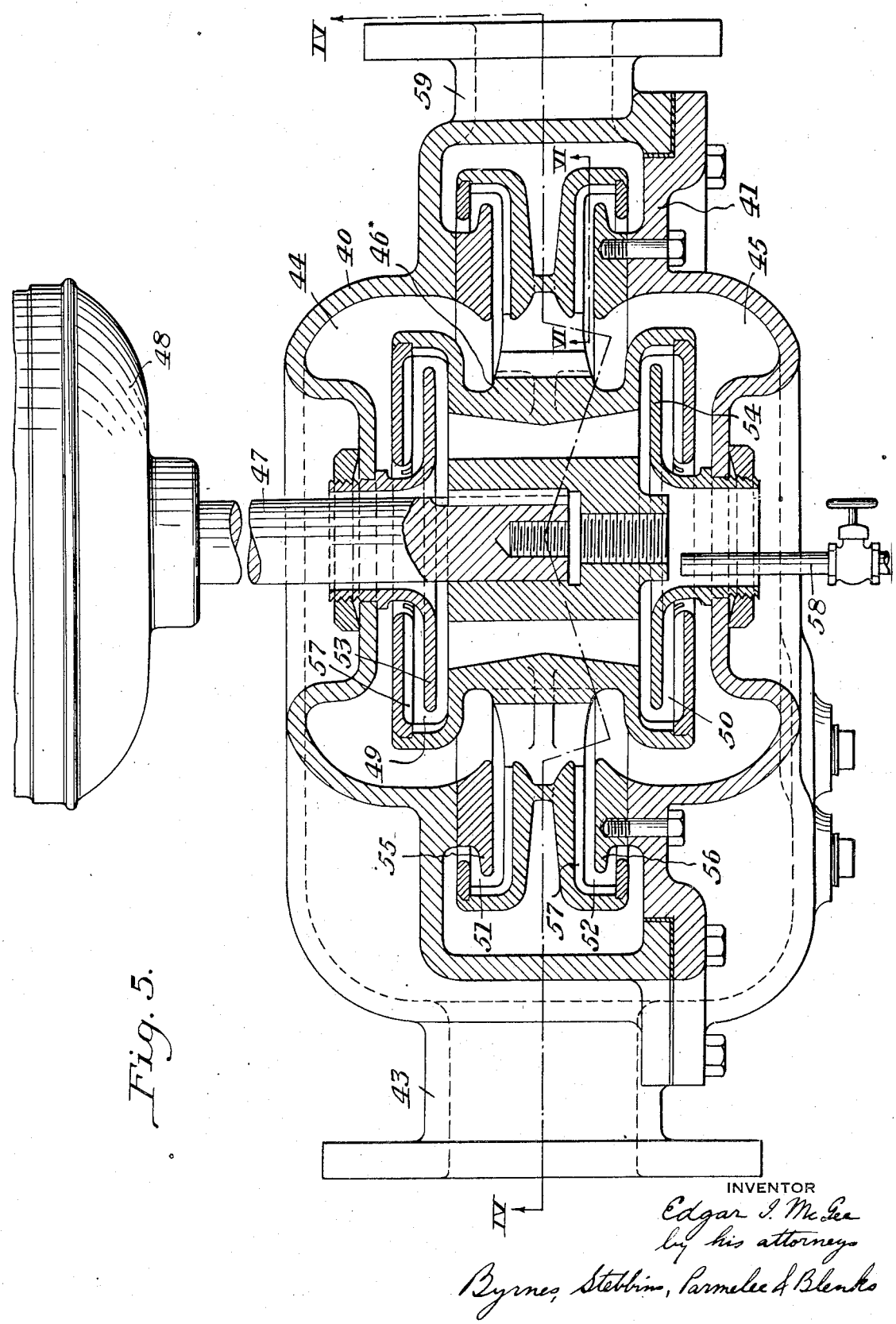
Figure 5 is a horizontal transverse sectional view along the line V—V of Figure 3.

Figures 3, 4, and 5 illustrate a modified form of the invention. In this form of the invention, the pump casing is split transversely and comprises a shell 40 having an end plate 41 bolted thereto. The casing also has an inlet conduit 43 and annular inlet passages 44 and 45. An impeller 46 is keyed to a shaft 47, which is preferably the shaft of a motor 48.

Annular grooves or channels 49, 50, 51, and 52 are formed in the impeller, one side of each groove being formed by an annular ring secured to the body of the impeller. Cooperating rings 53, 54, 55, and 56 project into the annular channels. The bottom and side walls of the channels are provided with lateral projections 57 for imparting rotary motion to sealing fluid contained therein. These projections are similar to those shown in Figures 1 and 2, and are illustrated in greater detail in Figure 6.

The principles underlying the construction and operation of the form of invention shown in Figures 3, 4, and 5 are similar to those already described. The difference between the two forms is that in the first, the channels containing the sealing medium are formed in the pump casing and receive cooperating rings on the impeller. In the second, the grooves or channels are formed in the impeller and the cooperating rings are secured to the pump casing. The first form is much simpler mechanically and is preferable for that reason, although the second form may be used where it is necessary to have the pump casing split transversely.

In operation, the channels 49 and 50 are supplied with a sealing fluid such as water from any convenient source, an example of which is the pipe 58 which may be connected to the high-pressure side of the pump or to any other source of fluid. After the pump has been started, it is primed and it then begins to supply water to the outlet conduit 59. The rotation of the channels 49 and 50 whirls the water contained therein and the centrifugal effect on the annular ring of water thus formed, balances the pressure of the atmosphere externally of the pump casing. The vacuum within the pump is, therefore, preserved and water is continuously supplied to the outlet conduit.

The channels 51 and 52 serve in the manner already described to seal the high-pressure chamber of the pump against the low-pressure intake chamber. By-passing and churning of the water is then avoided and all the water engaged by the impeller blades is driven through the outlet conduit.

I have found that the use of sealing rings and channels for the discharge conduit of a centrifugal pump requires considerable energy and so affects the efficiency of the device adversely. This drawback may be overcome by omitting the centrifugal seals on the discharge side. When the impeller is of the open type as opposed to the closed type shown in the drawings, the centrifugal seal for the high pressure or discharge side of the pump is not necessary.

Figure 7:
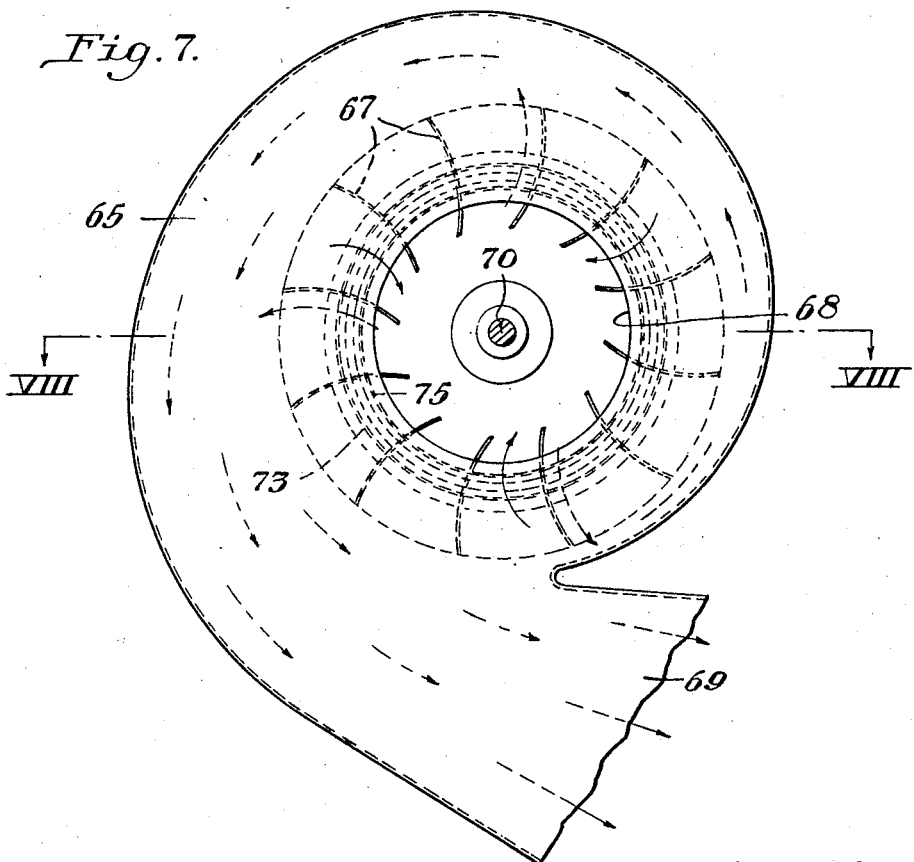
Figure 7 is a side elevation of a fan embodying the construction necessary for practicing the invention.
Figure 8:
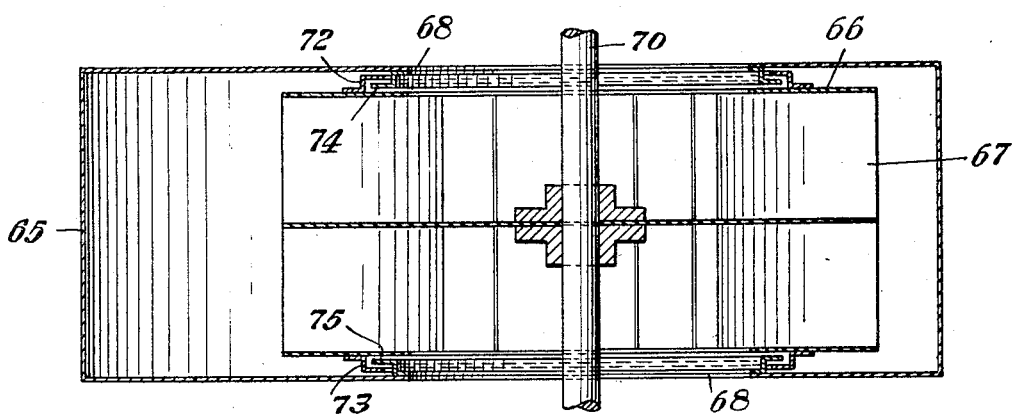
Figure 8 is a sectional view along the line VIII—VIII of Figure 7.
Figure 9:
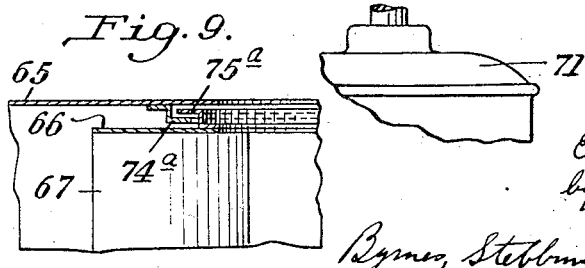
Figure 9 is a partial sectional view of a modified form.

The invention is applicable not only to centrifugal pumps, but also to centrifugal fans or blowers such as are illustrated in Figures 7, 8, and 9. Referring first to Figures 7 and 8, a centrifugal fan comprises a casing 65 and a wheel 66 therein. The wheel 66 has blades 67, which, when the wheel is rotated, draw air through the "eyes" 68 of the fan and force it out of a discharge pipe 69. The fan wheel 66 may be directly mounted on the shaft 70 of a motor 71. In the larger sizes, it may be necessary to provide a separate shaft and bearings for the wheel and a coupling therefor.

Because of inaccuracies in manufacture which are encountered in the large sizes, a considerable clearness is provided between the wheel and the casing. I prevent leakage through this clearance space by fitting annular channels 72 and 73 on the fan wheel. Cooperating annular rings 74 and 75 on the casing project into the channels. A sealing fluid such as water is supplied to the channels and, when the wheel is rotated, forms an annular seal between the wheel and casing in the manner already described with reference to centrifugal pumps. The channels 72 and 73 may have their side and end walls corrugated or otherwise provided with blades to insure rotation of the sealing fluid. All leakage of air from the casing around the wall and through the eyes is thus prevented and a high efficiency of operation insured.

In some cases, it may be desirable to apply the sealing channel to the casing of the fan, as shown in Figure 9. In such case, an annular channel 74ª is secured to the casing and supplied with sealing fluid. A cooperating annular ring 75ª on the wheel completes the seal according to the principles already explained.

From the foregoing description, it will be apparent that pumps or fans embodying the invention are characterized by numerous advantageous features not obtained in any structure known heretofore. The cost of the apparatus is reduced by elimination of the pump shaft, bearings and oiling systems therefor, a cooling means for the bearings, and the coupling between the usual pump shaft and the motor shaft. In addition, all stuffing boxes and packing glands, together with their usual maintenance difficulties are gotten rid of.

Close running fits between stationary and rotary members are avoided and the construction is considerably cheapened by this fact. Since wide clearances are provided, slight inaccuracy of alinement of parts is not likely to cause injury to the equipment. As previously mentioned, pump casings may be split horizontally or vertically.

As well as avoiding the objections to previous constructions, the invention has additional advantages. The seal may be adapted to open or closed impellers and to either the single or double inlet type. The seal can also be applied between the stages of multi-stage pumps, as well as to the vacuum chamber of vertical, deep well, centrifugal, or turbine pumps.

Another important advantage is that the pump will not run hot if the water supply is exhausted, because of the wide clearance between stationary and rotary members. This is a great advance over the stuffing-box type of pump in which great damage results from failure of water supply. The original efficiency of the pump will be higher than that of former types of pumps since bearing and stuffing box friction is eliminated. The original efficiency will be maintained longer since there are no wearing surfaces and the sealing medium is not affected by wear. Another important advantage is that a pump embodying the present invention may be employed for handling gritty material which would rapidly destroy stuffing boxes and wearing rings in centrifugal pumps making use thereof. The wide clearances between rotating parts prevent substantially all friction, even though the fluid being handled contains a large amount of suspended matter.

Fans and blowers sealed by means of the invention have a greater fluid output and a higher operating efficiency than centrifugal fans which are without any seal between the wheel and the housing.

Although I have described but a few specific embodiments of the invention, the scope of the invention is in nowise limited thereto since it may be otherwise practiced within the scope of the appended claims.

I claim:

1. In a centrifugal fluid handling device, a casing member, an impeller member supported within the casing by means independent thereof and external thereto, said casing having annular inlet passages coaxial with the impeller and an annular discharge passage surrounding the impeller, suction and discharge seals for sealing the impeller to the casing on opposite sides of said inlet passages, comprising annular recesses with smooth walls in said casing on both sides of said inlets, and annular discs on the impeller projecting into said recesses, said discs having projections on the inlet side only for whirling a sealing fluid around said recesses.

2. A centrifugal fluid handling device comprising a stationary member which constitutes a casing and a cooperating movable member which constitutes a rotor, a shaft for the rotor, the first-mentioned member having an axial opening through which the last-mentioned member is supported and driven by said shaft, the last-mentioned member having blading for moving the fluid centrifugally, one of the members having an annular recess and the other of the members having a flange lying therein, the recess being effective for holding a liquid in sufficient quantity that upon rotation of the rotor the liquid is thrown outwardly by centrifugal force to constitute a seal, the flange and its recess being positioned adjacent said axial opening to constitute a suction seal between the shaft and the casing, and like flange-and-recess structure adjacent the periphery of the blading and constituting a pressure seal, the casing extending continuously from the suction seal to the pressure seal, the casing having a passage therein for supplying fluid to the blading between the suction seal and the pressure seal, that member of the flange-and-recess structure which is carried by the rotor having ribs thereon for assisting in throwing the liquid outwardly in the recess, the ribs being on that side of the flange which is subject to the lower pressure.

EDGAR I. McGEE.